United States Patent [19]

Uesugi et al.

[11] Patent Number: 5,570,191

[45] Date of Patent: Oct. 29, 1996

[54] IDENTIFICATION OF CONNECTOR TERMINALS

[75] Inventors: Hitoshi Uesugi; Tsutomu Maki; Kazuyoshi Tomikawa; Tatsuya Maeda; Yoshimi Masuda, all of Haibara-gun, Japan

[73] Assignee: Yazaki Corporation, Tokyo, Japan

[21] Appl. No.: 321,035

[22] Filed: Oct. 6, 1994

[30] Foreign Application Priority Data

Oct. 8, 1993 [JP] Japan .................................. 5-253408

[51] Int. Cl.⁶ ........................................................ G01J 3/46
[52] U.S. Cl. ............................................. 356/402; 250/226
[58] Field of Search ........................... 356/402–411, 419, 356/425; 250/226

[56] References Cited

U.S. PATENT DOCUMENTS 3,778,751  12/1973  Walsh ............................... 439/491
4,140,220  2/1979  Hazeltine et al. ............... 356/407 X
4,454,029  6/1984  Codding ............................ 250/226 X
4,505,589  3/1985  Ott et al. ............................. 356/402

FOREIGN PATENT DOCUMENTS 60-100771  6/1985  Japan .
2-674  1/1990  Japan .
3-133079  6/1991  Japan .
5-050031  3/1993  Japan .

*Primary Examiner*—K. Hantis
*Attorney, Agent, or Firm*—Armstrong, Westerman, Hattori, McLeland & Naughton

[57] ABSTRACT

Connector housings having plural kinds of terminals (plated with different materials, e.g.) are mounted at predetermined locations, positioned and secured by a drive means. A sensor probe which receives a light, of a color detection device, is transferred successively to the locations opposite to the terminals. A color sensor senses a level of a specific color component of the light received by the sensor probe. The sensed level is compared with a predetermined reference level and it can be determined based upon whether the sensed level is higher than the reference level, the kind of the terminals in the connector housings.

9 Claims, 7 Drawing Sheets

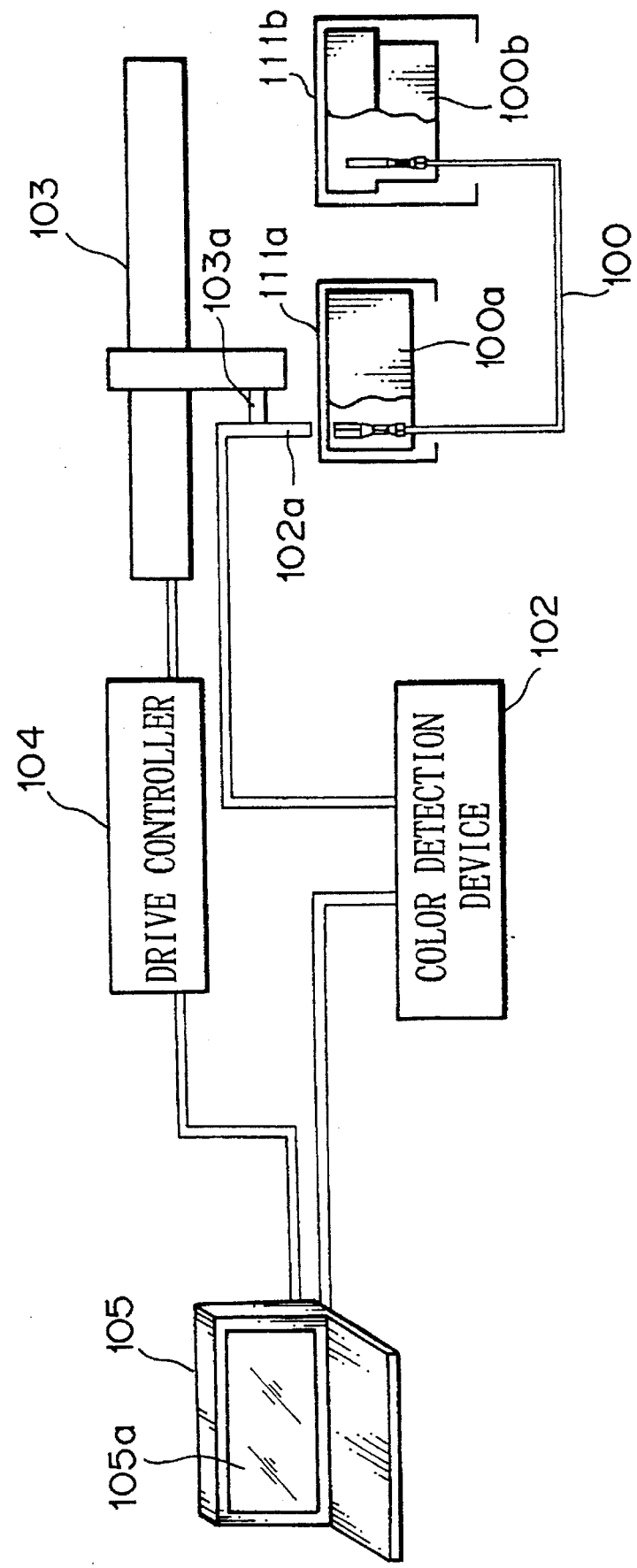

SIGNAL R

SIGNAL G

SIGNAL B

SIGNAL OK    SIGNAL NG

IDENTIFICATION OF CONNECTOR TERMINALS

BACKGROUND OF THE INVENTION

1. Field of the Invention

This invention relates to a method and an apparatus for identifying connector terminals, and more particularly to a method and an apparatus for identifying terminals which are plated with different kinds of plating materials such as gold or tin and are mounted in connectors attached to ends of wiring harnesses connecting with each other.

2. Prior Art

As this kind of apparatus, conventional apparatuses having such a structure as illustrated in FIG. 9 have been utilized. In the figure, numeral 1 denotes a receptacle connector, wherein a plurality of terminal openings 11a, in which terminal pins (not illustrated in the figure) of a plug connector are inserted, are formed in a receptacle connector housing 11. And, inside of terminal openings 11a, receptacle connector terminals 12, which making electric connections with inserted terminal pins, are received and held therein. The receptacle connector terminals 12 are positioned as a part of the terminal 12 being able to be seen from the terminal opening 11a.

By the way, with a reduction in weight of wiring harnesses, a miniaturization of connectors and, further, a miniaturization of connector terminals have been making a progress in recent years. This small-sized terminals are plated with gold or tin according to their purposes. For example, to terminals for circuits of air bags not used except an emergency and requiring high reliability, gold-plated terminals are applied even though those costs are high. Since other terminals in the same connector may be tin-plated ones, gold-plated terminals and tin-plated terminals, being mixed, are mounted together in one connector.

However, the both terminals are normally formed in the same shape and in the same size for reason of using the same forming mold. Therefore, even in a connector slot to receive a gold-plated terminal, a tin-plated terminal can be inserted and attached.

As a result, it causes a wrong arrangement of the terminals with high possibility. That is, it is not intended to prevent a wrong arrangement of the terminals by differing the terminals in shape such, that a wrong terminal can not be attached.

Particularly, when a tin-plated terminal is mounted wrongly to a slot for a gold-plated terminal, it causes the problem that a reliability of the connectors is considerably reduced.

In FIG. 9, numeral 2 denotes an apparatus for identifying terminals which are plated with different kinds of material such as gold or tin, wherein whether each of plated terminals is correctly arranged in each corresponding slot of a connector 1 is recognized in a final inspection in regard to a wiring harnesses production. This apparatus is comprised of a CCD (charge-coupled device) color camera 21 to pickup images and an image processor 22 for processing image data to identify terminals. The CCD camera 21 pick-ups images as transferring intermittently along a connector front face with the terminal openings 11a. Then, as shown in FIG. 10, image data of a couple of the terminal openings 11a of which images being taken at the same time thereon, are successively outputted. In FIG. 10, numeral 12 denotes terminals which can be partially seen through the terminal openings 11a.

The image processor 22 is inputted image data from the CCD color camera 21, processes the image data, extracts color characteristics, and, based on the extracted color characteristics, recognizes whether the terminals attached inside of the terminal openings 11a are plated with gold or with tin. According to the recognition, a decision is made as to whether each predetermined terminal has been arranged inside of its corresponding terminal opening 11a. The results are outputted in the form of a signal "OK" (right) or a signal "NG" (wrong).

SUMMARY OF THE DISCLOSURE

As mentioned above, in order to identify a gold-plated terminal or a tin-plated terminal, a gold color or a tin color has hitherto been extracted from image data outputted by a color camera. A color image signal is composed of the three primary colors of R(red), G(green) and B(blue), and each signal is stored in each frame memory correspondingly provided for each primary color. Based on the stored signals, a process of extracting a gold color element or a process of extracting a tin color element has been performed.

The conventional method requires a large memory to in order to identify a gold-plated terminal or a tin-plated terminal and CPU (central processing unit) for an undesirable and complicated extract process. Apparatuses related to the method have drawbacks of a large size and of a complication.

Considering the drawbacks of the prior art, this invention aims to provide a method which is able to identify more simply connector terminals which are plated with different kinds of material such as gold or tin.

Further, considering the drawbacks of the prior art, this invention aims to provide an apparatus, which is able to identify connector terminals which are plated with different kinds of material such as gold or tin, being simple in structure and small in size.

In order to achieve the above object, this invention provides a method for identifying connector terminals comprising the steps of:

a connector housing, in which plural kinds of terminals are mounted at predetermined locations, is positioned;

a sensor probe of a color detection device is transferred successively to locations opposite to the terminals in the connector housing;

a level of a specific color component, which is involved in a light received at the transferred locations, is sensed, wherein the specific color component in regard to each of the plural kinds of the terminals is different in level from each other; and the sensed level being compared with a predetermined reference level, the kinds of the terminals are distinguished according to whether the sensed level is higher than the reference level.

And, in order to achieve the above object, this invention provides an apparatus for identifying connector terminals, as shown in a plan of a primary structure thereof in FIG. 1, comprising:

means 111a and 111b for positioning a connector housing in which plural kinds of terminals are mounted at predetermined location;

a color detection device 102 having a sensor probe 102a which receives a light, a color sensor 102f for sensing a level of a specific color component which is involved in a light received at the sensor probe 102a, and a distinction means 102h for distinguishing the kind of the terminal, by comparing the sensed level with a predetermined reference level, according to whether the sensed level is higher than the reference level;

a drive means 103 for transferring the sensor probe of the color detection device successively to locations opposite to the terminals in the connector housing; and wherein the specific color component in regard to each of the plural kinds of the terminals is different in level from each other.

In the above-mentioned steps of the method:

the sensor probe of the color detection device is transferred successively to the locations opposite to the terminals in the positioned connector housing;

the level of the specific color component, which is involved in the light received at the transferred location, is sensed, wherein the specific color component in regard to each of the plural kinds of the terminals is different in level from each other; and the sensed level being compared with the predetermined reference level, the kind of terminal is distinguished according to whether the sensed level is higher than the reference level.

Therefore, only by comparing the sensed level with the predetermined reference level, the kind of the terminal being identified.

In the above-mentioned structure of the apparatus:

by means 111a and 111b, the connector housing, in which plural kinds of the terminals are mounted at predetermined locations, is positioned;

by the drive means 103, the sensor probe 102a, which receives the light, of the color detection device 102, is transferred successively to the locations opposite to the terminals in the positioned connector housing;

by the distinction means 102h, the level sensed by the color sensor 102f being compared with the predetermined reference level, the kind of the terminal is distinguished according to whether the sensed level is higher than the reference level.

Hence, the kind of the terminal can be identified by comparing the sensed level of the specific color component with the reference level, wherein the specific color component in regard to each of the plural kinds of terminals is different in level from each other.

BRIEF DESCRIPTION OF THE DRAWINGS

The present invention will be more apparent from the ensuring description with reference to the accompanying drawing wherein:

FIG. 2 is a schematic diagram of an embodiment of an apparatus for identifying connector terminals according to the present invention;

DESCRIPTION OF PREFERRED EMBODIMENT

Figure 1:
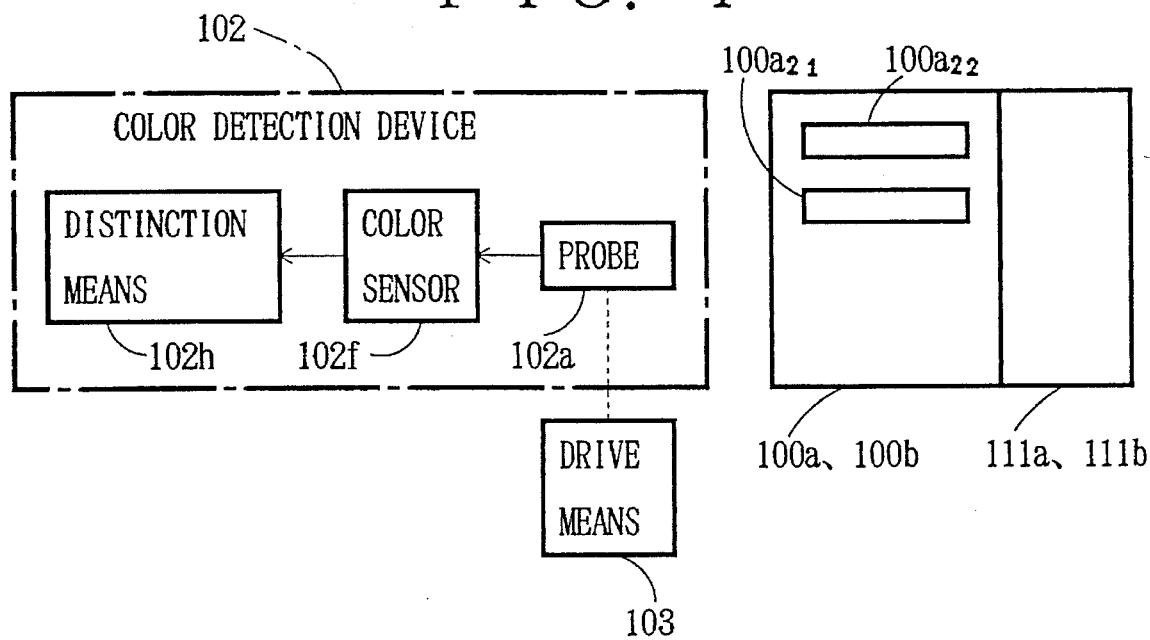
FIG. 1 is a plan showing a primary structure of an apparatus for identifying connector terminals according to the present invention.
Figure 3A:
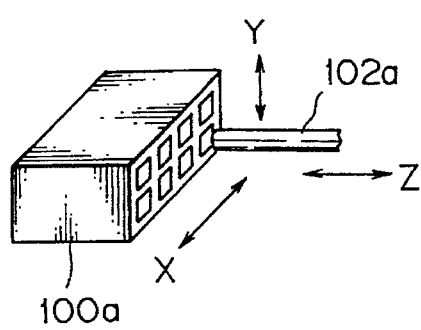
FIGS. 3A/3B are perspective views illustrating, in details, a part of FIG. 2.
Figure 3B:
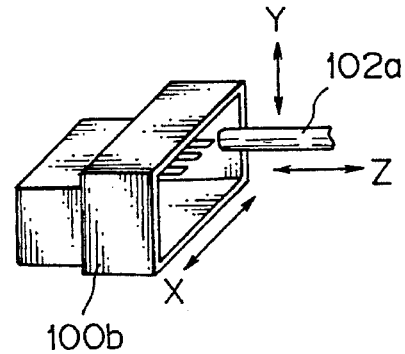

In the followings, embodiments of this invention are explained according to the accompanied drawings. In FIG. 2, there is shown an embodiment of an apparatus performing a method for identifying connector terminals. In the drawing, numeral 111a and 111b denote connector housing receivers, wherein a receptacle connector 100a and a plug connector 100b, being connected to both ends of a wiring harness 100, are positioned and detachably secured. Numeral 102 denotes a color detection device having a sensor probe 102a. The sensor probe 102a is supported by a support arm 103a of a drive unit 103 in order to oppose to front faces, in which terminal opening are formed, of the receptacle connector 100a and the plug connector 100b. By a movement of the drive unit 103, the sensor probe 102a is transferred, as shown in FIG.3A/3B, in three directions X, Y and Z which are orthogonal to each other.

By the way, numeral 104 denotes a drive controller for a servo control in regard to positioning of the drive unit 103. Numeral 105 denotes a personal computer including a control unit which outputs command signals for the color detection device 102/the drive controller 104 and determines whether correct terminals are located according to sensed signals being transmitted from the color detection device 102.

The drive controller 104 receives, from the personal computer 105, position data for transferring the sensor probe 102a. Based on the received position data, the drive controller 104 carries out a servo-actuated control for transferring the sensor probe 102a to predetermined positions, and, after a transfer completion to a predetermined position, transmits a completion signal to the personal computer 105. Meanwhile, the color detection device 102 compares a level of a specific color component, which is sensed by the color detection device 102 itself when the sensor probe 102a locating at a predetermined position, with a predetermined reference level to make a decision. Further, the color detection device 102 receives terminal kind data corresponding to predetermined positions of the sensor probe 102a; makes a decision as to whether the comparison result is coincident with the terminal kind data or not; and transmits the decided data to the personal computer 105.

For this purpose, the personal computer 105 has a data memory (not shown in the drawings) which stores together terminal position data; terminal kind data; and, coincidence or non-coincidence data received from the color detection device 102, wherein the terminals are mounted in a receptacle connector 100a/a plug connector 100b attached to both ends of an inspected wiring harness 100 positioned in connector housing receivers 111a and 111b.

Figure 4:
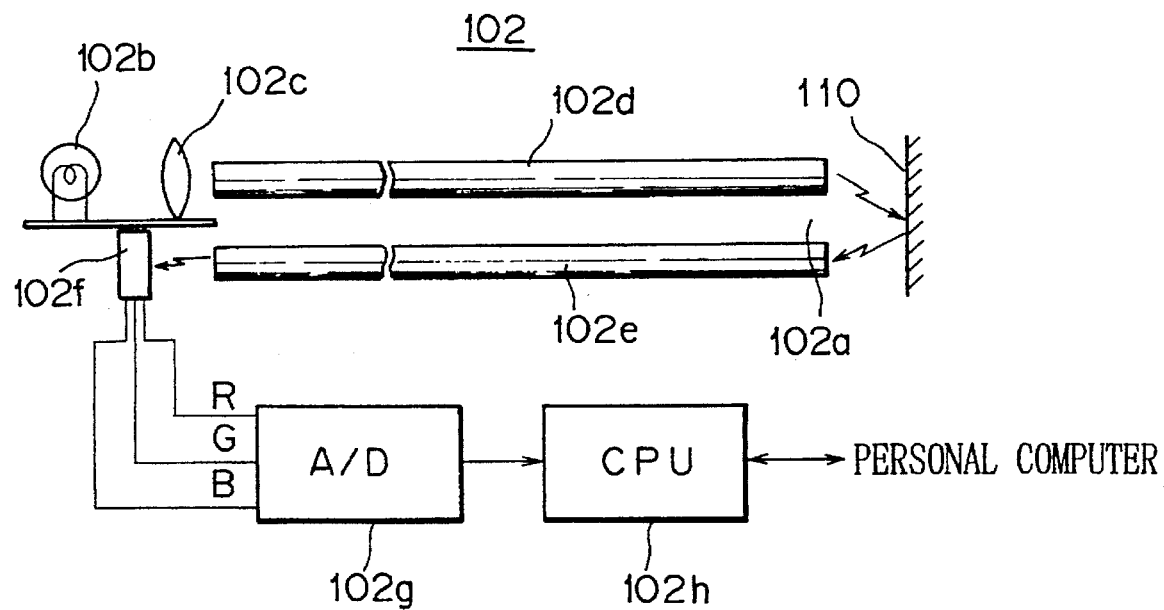
FIG. 4 is a plan showing, in more specified, a part of FIG. 2.

The color detection device 102, with such a detailed structure as shown in FIG. 4, comprises a high luminance-brightness light source 102b such as a halogen lamp; a beam-condensing lens 102c for a light from the light source; an illumination optical fiber 102d for illuminating an object 110 by conducting the condensed light; a detection optical fiber 102e for conducting a diffusing reflect light from the object; and a color sensing element 102f for receiving the diffusing reflect light conducted by the detection optical fiber 102e. The illumination optical fiber 102d and the detection optical fiber 102e are bundled together to get a cable and composes a sensor probe 102a, wherein one end of the optical fiber 102d and one end of the detection optical fiber 102e are supported by the support arm 103a (shown in FIG. 2).

In the color sensing element 102f, each color sensing element receives each corresponding light of R or G or B which has been resolved by color filters and outputs each of three signals of R, G and B. A specific color signal of the three signals, after converted to a digital signal by AD conversion circuits 102g, is transmitted to a microcomputer (CPU) 102h. The specific color signal is processed in CPU 102h, and, in respect of level, is compared with a predetermined reference level. CPU 102h communicates with the personal computer 105, receives terminal kind data, and transmits signals designating whether identified terminals are coincident with the kind of the terminals assigned by the terminal kind data.

Generally, the sensor probe 102a of the color detection device 102 extracts only colors of an object when the object is large in size, but, it does not receive only a color of a reflected light from the terminal because of a small size in regard to the terminal plated with gold or tin. However, a gold-plated terminal is different in color compositions of R, G, and B from a tin-plated terminal, and, even when the sensor probe 102a receives colors of the terminal and colors of a connector housing together, if the color of the connector housing is a single color of white or black, a gold plated terminal is different in color compositions of R, G, and B from a tin-plated terminal. By making use of this advantage, a connector terminal plated with gold or tin maybe distinguished without extracting a color itself of gold or tin.

Figure 5:
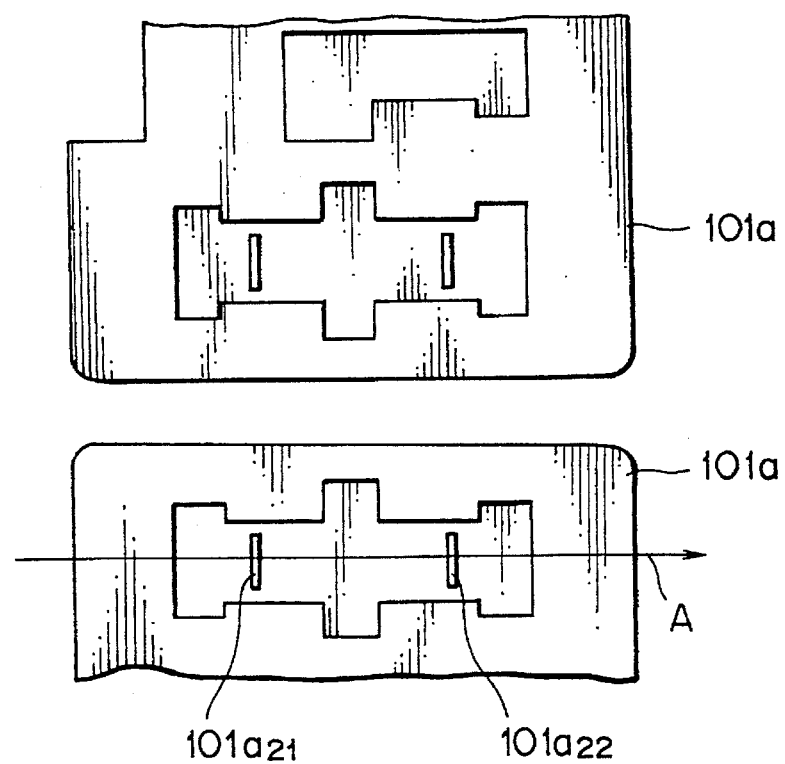
FIG. 5 is a plan illustrating an example of connector terminals.

More specifically, in case of such a receptacle connector housing 101a as illustrated in FIG. 5, the sensor probe 102a is moved, in an aligned direction of terminal openings 101a, (as shown by the arrow) across two female terminals 101a21 and 101a22, one of which being plated with gold while the other being plated with tin, located inside of terminal openings 101a.

Figure 6A:
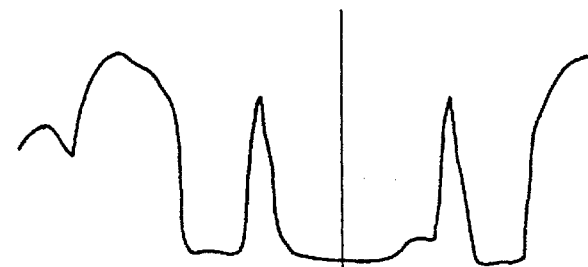
FIGS. 6A, 6B and 6C show graphs showing levels of three primary colors, obtained when a sensing probe transfers along connector terminals.
Figure 6B:
Figure 6C:
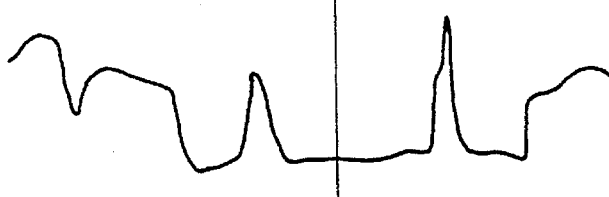

The color sensing element 102f (illustrated in FIG. 4) in the color detection device 102 outputs three primary color signals of R, G and B, as shown in FIG. 6, wherein each color signal has a peak appearing at a position corresponding to the terminal 101a21 or 101a22. The signal R and the signal G have no distinguishing differences between peaks appearing at positions corresponding to both terminals, but the signal B has a apparently lower peak appearing at a position-corresponding to a gold-plated terminal 101a21 than a peak appearing at a position corresponding to a tin-plated terminal 101a22.

Therefore, a light received by the sensor probe 102a being resolved to obtain a signal B at a position of each terminal, the signal B is converted to digital data by AD conversion and is transmitted to CPU 102h. By comparing it with a predetermined reference level, it can be known immediately whether a terminal mounted in the position is plated with gold or with tin. Moreover, by comparing the data with terminal kind data, it can be known immediately whether the terminal is to correct type for these kind of terminals.

In view of this, for example, when a sensed level is higher than a reference level, the terminal is tin-plated. And, when the corresponding terminal kind data thereof designates gold-plated one, a non-coincidence signal is outputted. When the corresponding terminal kind data thereof designates tin-plated one, a coincidence signal is outputted.

While, a sensed level is lower than a reference level, the terminal is distinguished as a gold-plated one. And, when the corresponding terminal kind data thereof designates a gold-plated one, a coincidence signal is outputted. When the corresponding terminal kind data thereof designates a tin-plated one, a non-coincidence signal is outputted.

Then, a personal computer 105 having received a coincidence/a non-coincidence signals sets up flags of coincidence/non-coincidence in an area provided as corresponding to the terminal kind data.

The flags are used to display terminal positions of non-coincidence terminals by a display or to print out them on a recording paper.

Figure 7:
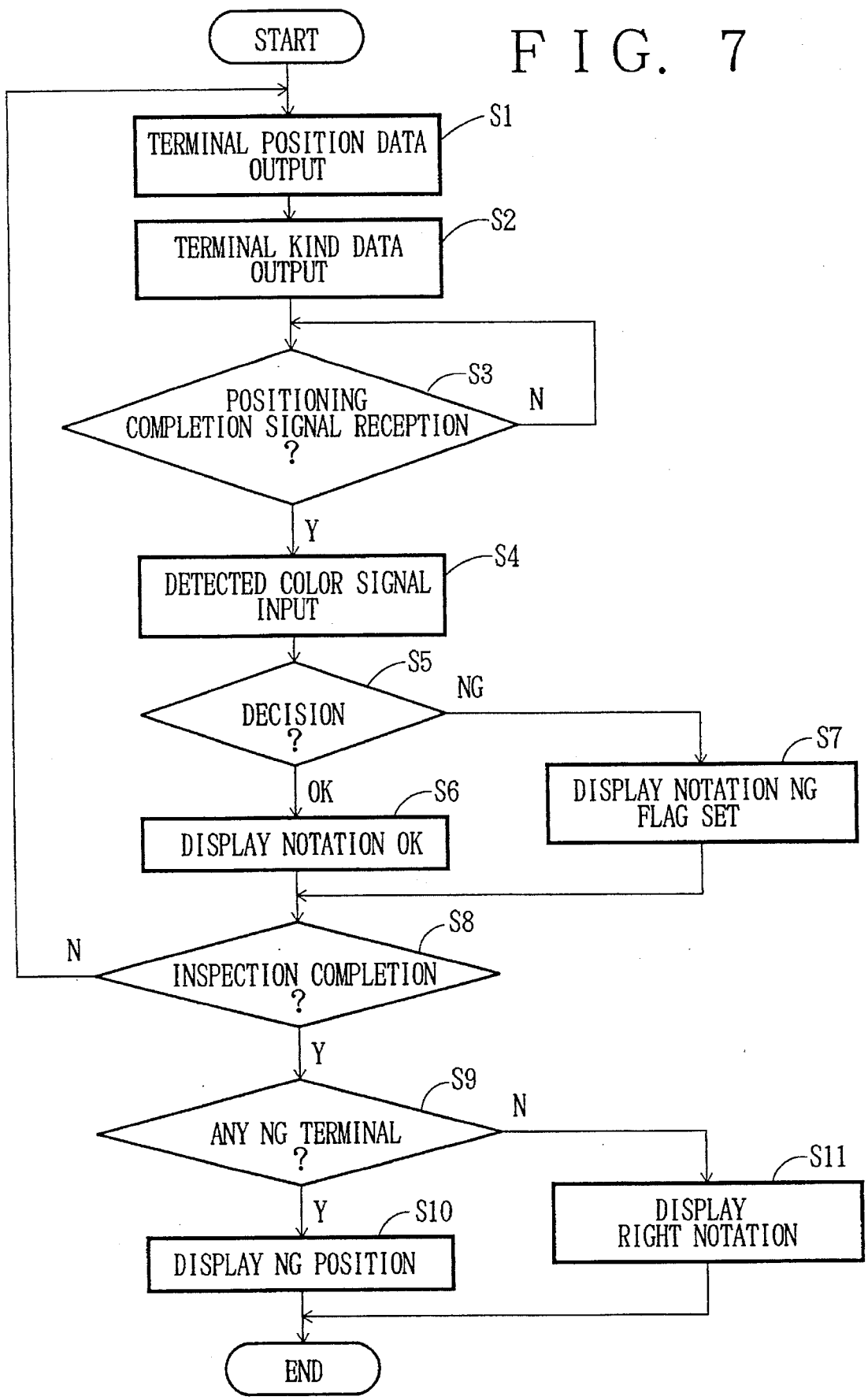
FIG. 7 is a flow chart showing processes of a personal computer in FIG. 2.
Figure 8:
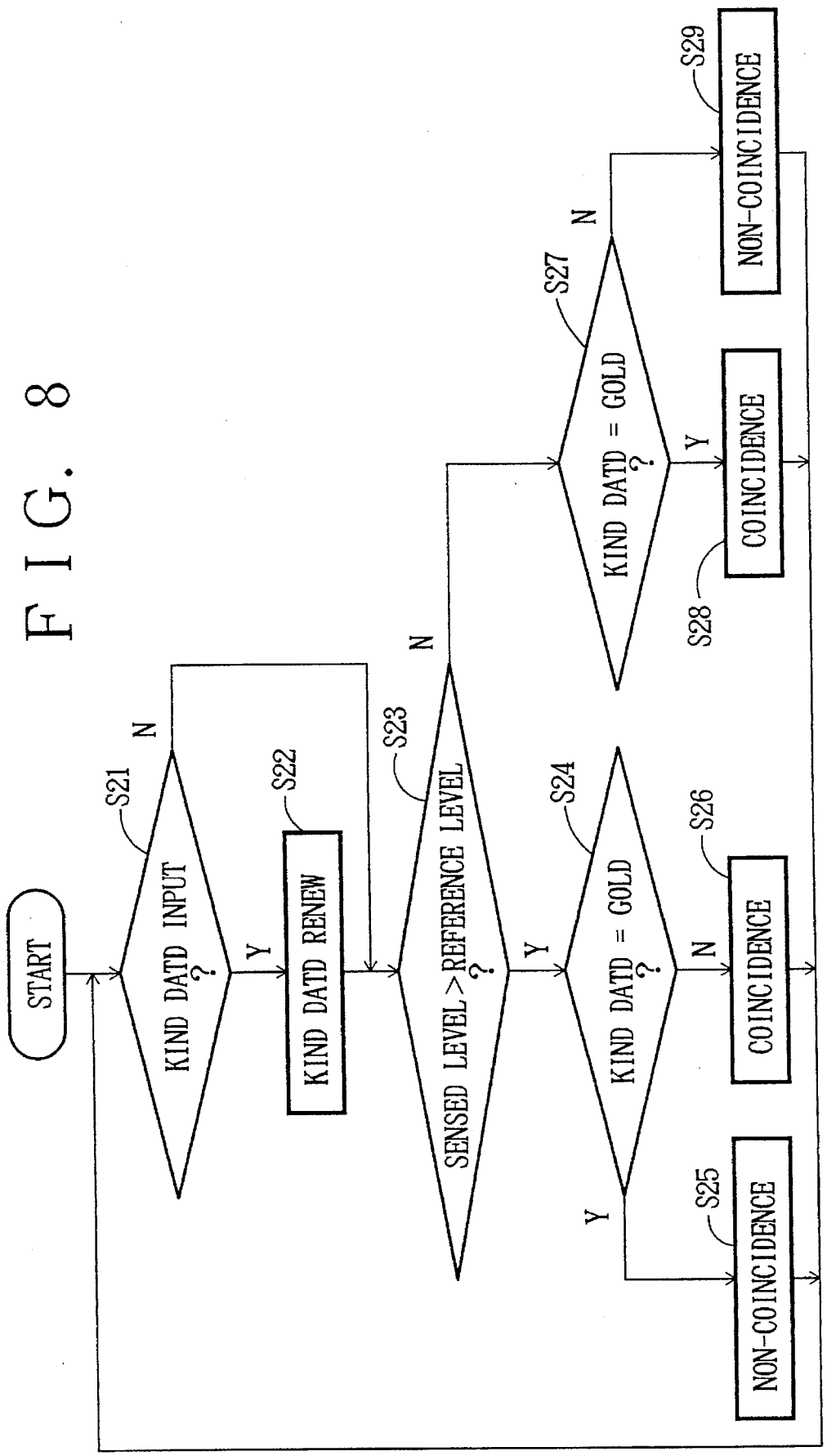
FIG. 8 is a flow chart showing processes of CPU in FIG. 4.
Figure 9:
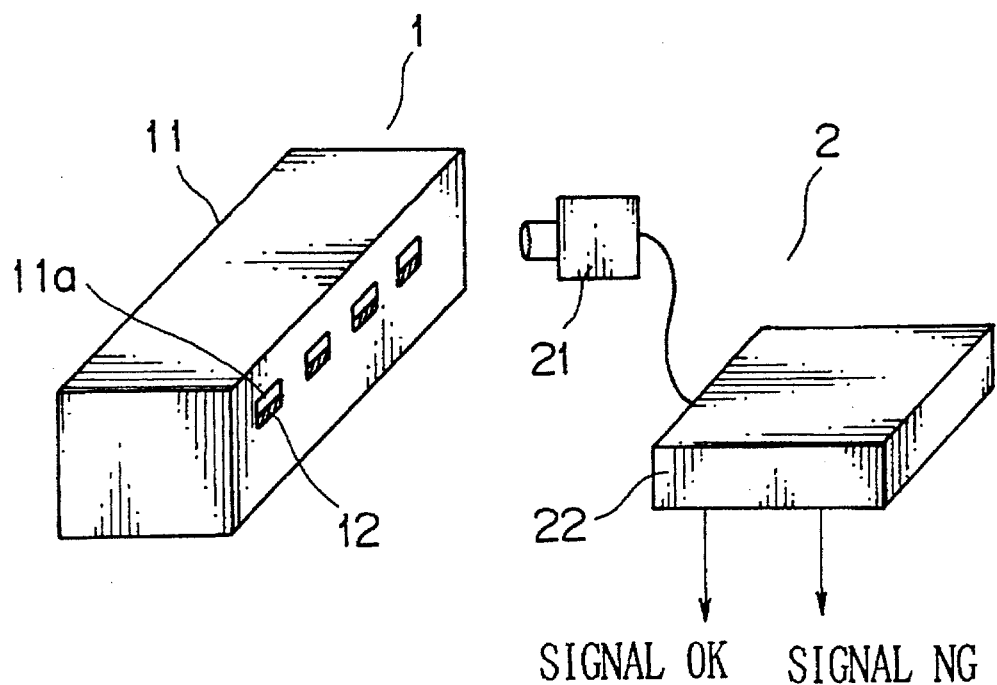
FIG. 9 is a perspective view of a conventional apparatus for identifying connector terminals.
Figure 10:
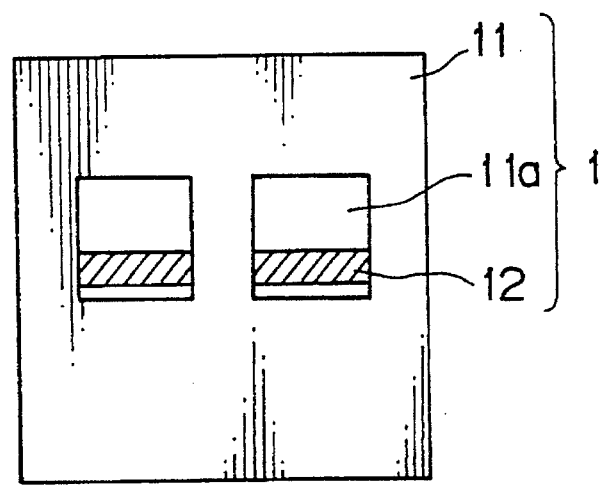
FIG. 10 is a plan showing, in details, terminals and terminal openings.

Detailed operations of the generally aforementioned apparatus are explained in the followings as flow charts of FIG. 7 and 8, which showing a process performed by the personal computer 105 and CPU 102h, being referred.

Firstly, referring to a flow chart in FIG. 7, we explain an operation of the personal computer 105. The personal computer 105 starts an operation by a run start signal of connecting with a power source. In the first step S1, the personal computer 105 outputs terminal position data, in regard to identifying terminals, to the drive controller 104. In a following step S2, terminal kind data of identifying terminals are outputted to CPU 102h of the color detection device 102. Then, the program execution proceeds to a step S3. After a reception of a completion signal of connector locating from the drive controller 104, when the decision of the step S3 gets "YES" with receiving the completion signal of a connector positioning, the program execution proceeds to a step S4.

In the step S4, after a signal from the color detection device 102 is inputted, the program execution proceeds to a step S5. Thereon, a decision is made as to whether the imputed signal is a coincidence signal (OK) or a non-coincidence signal (NG). In case of a signal OK in the decision, the program execution proceeds to a step S6 and after displaying a notation OK on a display 105a of a personal computer 105, the program execution proceeds to a step S8. In case of a signal NG, after displaying a notation NG on a display 105a of the personal computer 105 and setting up a flag in an area provided as corresponding to the terminal kind, the program execution proceeds to the step S8.

In the step S8, a decision of an inspection completion is made, for example, according to whether resulting data of all terminal positions are outputted. Thereon, in case of a decision of "NO", the program execution returns back to the step S1 and the aforementioned steps are repeated.

In the step S8, in case of a decision of "YES", the program execution proceeds to a step S9, making a decision as to whether there is a flag set up in the step S7, when the decision is "YES", the program execution proceeds to a step S10 and displays a position of NG on the display 105a. When there is not a flag and the decision in the step S9 is "NO", the program execution proceeds to a step S11, displays a notation that all of the terminals are correctly located, on the display 105a. Thereby, the sequential operations are completed.

Secondly, referring to a flow chart in FIG. 8, we explain an operation of CPU 102h.

CPU 102h starts an operation by a run start signal of a connection with a power source. In the first step S21, CPU 102h makes a decision as to whether terminal kind data has been inputted, and, in case of a decision "YES", the program execution proceeds to a step S22 and renews a terminal kind data stored already in a work area of RAM random-access memory; not illustrated in the drawings), that is, updating the data, and then proceeds to a step S23. While, in case of a decision "NO" in the step S21, the program execution proceeds to the step S23.

In the step S23, CPU 102h, by comparing a sensed level with a reference level, makes a decision as to whether the sensed level is higher than the reference level, wherein the sensed level is a level of a specific color component (component B) sensed by the specific color sensing element 102f.

Further, a reference level data may be set up in a corresponding program or may be set up by being transmitted from the personal computer 105. When a decision in the step S23 is "YES", that is, when a sensed level is higher than a reference level and the detected terminal is distinguished as a tin-plated one, the program execution proceeds to a step S24 to decide as to whether corresponding terminal kind data, which is stored in a work area of RAM, designates a gold color. When a decision in the step S24 is "YES", the program execution proceeds to a step S25 and a non-coincidence signal (NG) is outputted. While, when a decision in the step S24 is "NO", the program execution proceeds to a step S26 and a coincidence signal (OK) is outputted. Each of these signals is transmitted to the personal computer 105 and then the program execution returns to the step When a decision in the step S23 is "NO", that is, when a sensed level is lower than a reference level and the detected terminal is distinguished as a gold-plated one, the program execution proceeds to a step S27 to decide as to whether corresponding terminal kind data, which is stored in a work area of RAM, designates a gold color. When decision in the step S27 is "YES", the program execution proceeds to a step S28 and a coincidence signal (OK) is outputted. While, when a decision in the step S27 is "NO", the program execution proceeds to a step S29 and a non-coincidence signal (NG) is outputted. Each of these signals is transmitted to a personal computer 105 and then the program execution returns to the step S21.

The followings are an explanation of CPU 102h and are apparent in the above explanation of the flow chart in FIG. 8;

CPU 102h works as a distinction means for distinguishing connector terminal kinds, that is, the color sensor 102f detects a level of a specific color component which is involved in a light received by the sensor probe 102a of the color detection device 102, and CPU 102h identifies the kind of the terminals, by comparing the sensed level with the predetermined reference level, according to whether the sensed level is higher than the reference level or not.

Further, in the aforementioned embodiment, as distinguishing a terminal plated with gold or tin, a specific color signal delivered from a color sensing element is a signal B. In case of other kinds of terminals, another color signal will be selected advantageously as a specific color signal.

As mentioned above, this invention enables to identify kinds of connector terminals, without a large memory and a complicated process, only by comparing a sensed signal level with a reference level, and, thereby, can provide an apparatus being simple in configuration and small in size.

In the above-mentioned structure of the apparatus:

the connector housing is positioned and secured;

the sensor probe is transferred to the locations opposite to the terminals in the positioned connector housing; and the kinds of the terminals being distinguished, by comparing the sensed level of the specific color with the predetermined reference level, according to whether the sensed level is higher than the reference level or not.

As a result, without a large memory and a complicated process, the apparatus can be simple in configuration and small in size.

What is claimed is:

1. A method for identifying connector terminals comprising the steps of:

positioning a connector housing including plural kinds of terminals mounted at predetermined locations;

moving a sensor probe of a color detection device across locations of said terminals in said connector housing;

sensing a level of a specific color component of light received by said sensor probe while performing the step of moving the sensor probe; and comparing the sensed level with a predetermined reference level, and determining a type of terminal according to whether the sensed level is higher than the reference level.

2. The method for identifying connector terminals according to claim 1, wherein the types of terminals include gold-plated terminals and tin-plated terminals.

3. The method for identifying connector terminals according to claim 2, wherein said specific color includes a primary color of blue.

4. The method for identifying connector terminals according to claim 3, wherein a color of said connector housing includes a single color of white or black.

5. An apparatus for identifying connector terminals comprising:

means for positioning a connector housing including plural kinds of terminals mounted at predetermined locations;

a color detection device having a sensor probe which receives light, a color sensor for sensing a level of a specific color component of the light received by said sensor probe, and means for determining a terminal type, comparing the level sensed by said color sensor with a predetermined reference level, and determining whether the sensed level is higher than the reference level; and drive means for successively transferring said sensor probe of said color detection device to locations opposite to said terminals in said connector housing.

6. The apparatus for identifying connector terminals according to claim 5, wherein the plural kinds of the terminals includes gold-plated terminals and tin-plated terminals.

7. The apparatus for identifying connector terminals according to claim 6, wherein said specific color includes a primary color of blue.

8. The apparatus for identifying connector terminals according to claim 7, wherein a color of said connector housing includes a single color of white or black.

9. The apparatus for identifying connector terminals according to claim 5, 6 or 7, wherein said determining means determines a terminal type based on data corresponding to the transferred position of said sensor probe.

* * * * *